United States Patent [19]

Tanny

[11] 4,327,879
[45] May 4, 1982

[54] MAGNETIC TAPE REEL

[75] Inventor: Michael W. Tanny, Westminster, Calif.

[73] Assignee: Memorex Corporation, Santa Clara, Calif.

[21] Appl. No.: 195,677

[22] Filed: Oct. 9, 1980

[51] Int. Cl.³ .............................................. B65H 75/18
[52] U.S. Cl. ..................................................... 242/71.8
[58] Field of Search ................. 242/71.8, 118.4, 118.7, 242/118.8, 116

[56] References Cited

U.S. PATENT DOCUMENTS

| | | | |
|---|---|---|---|
| 3,410,500 | 11/1968 | Elliott | 242/71.8 |
| 4,044,965 | 8/1977 | Posso | 242/71.8 |
| 4,052,020 | 10/1977 | Knox | 242/71.8 |
| 4,083,509 | 4/1978 | Vasadeva | 242/71.8 |
| 4,088,278 | 5/1978 | Adair | 242/71.8 |

Primary Examiner—Edward J. McCarthy
Attorney, Agent, or Firm—Limbach, Limbach & Sutton

[57] ABSTRACT

An improved magnetic tape reel for computers is taught which comprises a central part carrying a driving hub having a first set of spokes extending radially outward from the outer surface of the hub and a support ring concentric with the hub and having a second set of spokes extending radially inwardly from the inner surface of the ring. Two side flanges are ultrasonically welded to the central part along the spokes forming a box-like structure having a high resistance to compression produced by tape being wound thereon.

4 Claims, 4 Drawing Figures

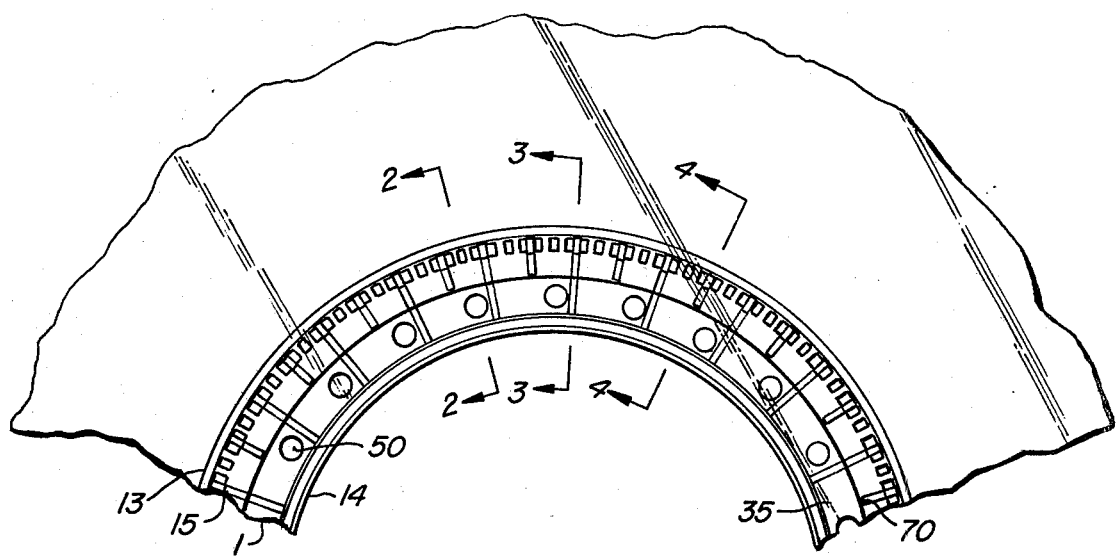
FIG._1.
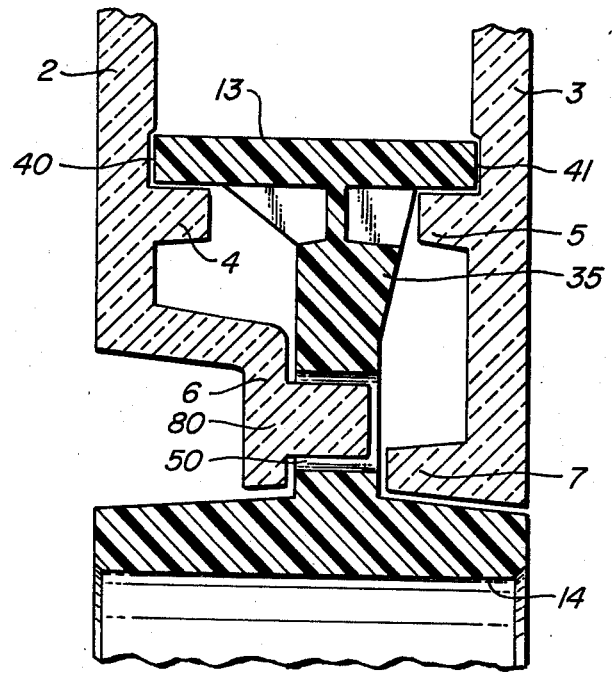
FIG._2.

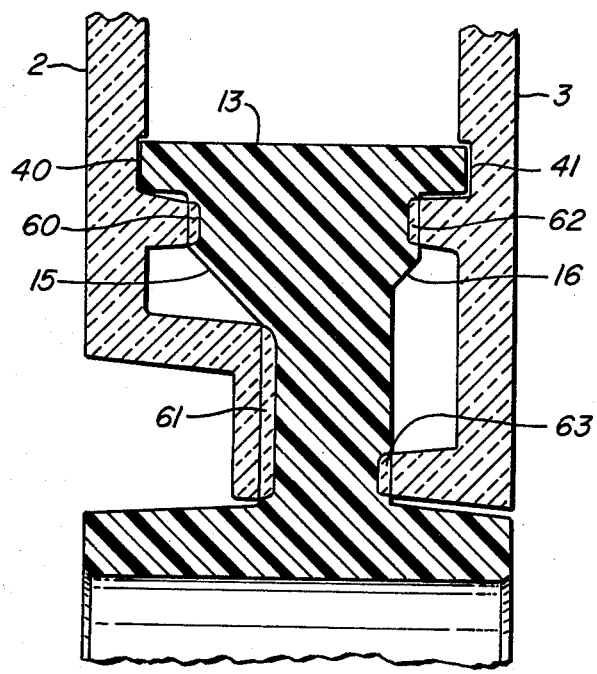
FIG._3.
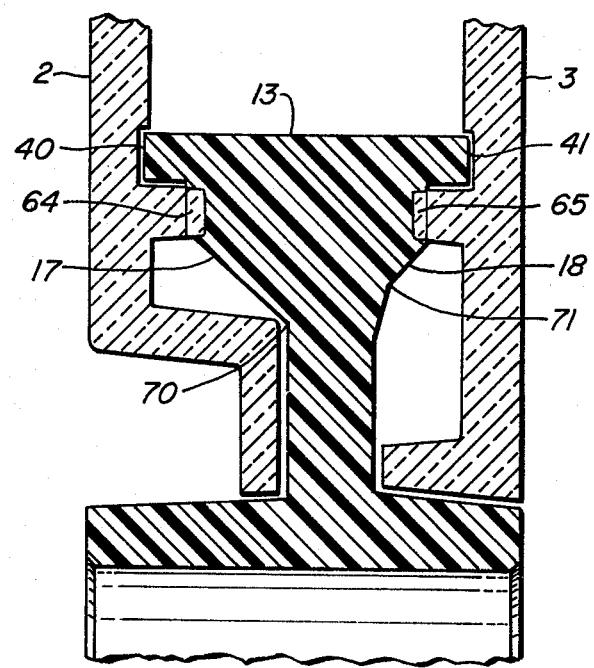
FIG._4.

MAGNETIC TAPE REEL

BACKGROUND OF THE INVENTION

The basic concept of a magnetic tape reel comprised of two flanges connected to a central hub has been known for some time. For example, in U.S. Pat. No. 3,632,053 such a structure is shown.

An improvement to this basic structure was taught in U.S. Pat. No. 4,044,965 in which a box-like or caisson configuration was taught comprising a hub, ring for supporting the magnetic tape and flanges. The box-like structure was taught to have sufficient rigidity to avoid hub deformation and flange buckling, while the tape was being wound on the ring.

According to U.S. Pat. No. 4,044,965, it was taught that the flanges were to be welded to the central part of the reel on each side thereof proximate the ring and hub sections. The polystyrene, for example, parts would be ultrasonically welded to form a box-like structure which exhibited better resistance to compression produced by tape being wound on the support ring. The flanges presented rather small-dimensioned projections on the internal faces of the central part defining a substantially cylindrical welding surface to the side flanges.

Although the magnetic tape reel as disclosed in U.S. Pat. No. 4,044,965 represented an advance in the art, the design also posed certain problems and it is an object of the present invention to teach a novel magnetic tape reel which possesses the box-like structure and rigidity of the prior art without the drawbacks as explained below.

The primary disadvantages inherent in the structure taught in U.S. Pat. No. 4,044,965 is the substantial difficulty encountered by manufacturers of such a device in maintaining constancy throughout the circumference of the reel in achieving an acceptable weld. It is quite common to experience some part-to-part irregularities and flange-to-hub misalignments which would prevent full circumferential contact between the annular collars of the central part and the welding surfaces of the side flanges. The areas of weld contact between the central part and the flanges along their entire circumferential lengths are of a relatively small dimension and any part inconsistencies or processing misalignments many times result in inconsistent weld areas and resulting part rejection.

The present invention can be more readily appreciated by viewing the appended drawings in which:

FIG. 1 is a side elevation illustrating a section of the reel of the present invention.

FIG. 2 is a cross-sectional view along the line 2—2 of FIG. 1.

FIG. 3 is a cross-sectional view along the line 3—3 of FIG. 1.

FIG. 4 is a cross-sectional view along the line 4—4 of FIG. 1.

BRIEF DESCRIPTION OF THE INVENTION

The present invention comprises a magnetic tape reel preferably used in computer operations where a high degree of accuracy is mandatory. The reel possesses those advantages shown in U.S. Pat. No. 4,044,965, but is improved thereover in the elimination of welding surfaces in the form of annular collars and, as a substitute therefor, spokes are provided extending radially outward from the outer surface of the hub and further spokes extending radially inward from the inner surface of the tape support ring. The side flanges are ultrasonically welded only on the spokes forming a box-like structure having a high resistance to compression.

DETAILED DESCRIPTION OF THE INVENTION

Referring now to the drawings, FIG. 1 shows a central part 1 which is monolithic having driving ring 13 and hub 14 connected by central part 35. Side flanges 2 and 3 delimit opposite free ends of ring 13 at joggles 40, 41. In this way, the connection of the flanges with the ring is made with a sharp edge as a support structure in contact with the magnetic tape to be wound thereon. Spokes 15 and 16 extend radially between ring 13 and hub 14 on opposite sides of central part 35. The profile of the spokes are shown in FIG. 3. Yet another set of spokes 17 and 18 are employed extending radially from the inner surface of driving ring 13 toward the driving hub with spokes 17 and 18 terminating at points 70 and 71 before radially reaching said hub. Preferably, spokes 17 and 18 terminate approximately half way down central part 35. The purpose of this is to aid in aligning projections 80 extending from the sides flanges 2 and 3 through repeating orifices 50, which in turn are provided for instant alignment of the side flanges 2 and 3 with the central part 35.

Side flanges 2, 3 possess extended surfaces 4, 5, 6, and 7 which, when placed proximate central part 35, abut the radially extending spokes at 60, 61, 62, 63 and 64 (FIGS. 3 and 4). Ultrasounds are emitted at the time when the side flanges are pressed against the radially extending spokes so that, at surface contact areas 60, 61, 62, 63, 64 and 65 the side flanges press into the spokes and penetrate into one another to produce, by shearing and softening, the weld areas 60, 61, 62, 63, 64 and 65. It is important to note that even rather gross misalignment caused by dimensional variance in part manufacture or in reel fabrication will not significantly affect the integrity of the welds.

Although the actual number of spokes and the composition of materials used herein are considered design variables, the selection of which would be obvious to one of ordinary skill in the art, it has been found that a central part 35 made of glass fiber filled with polystyrene with side flanges made of polystyrene has proven to be acceptable due to their ability to be ultrasonically weldable. In the past, applicant has employed twenty-four radially extending spokes 15, 16 on either side of central part 35 with an equal number of radiating spokes 17 and 18. Thus, each flange is welded to central part 35 at 72 radial points, 48 at the periphery of central part 35 proximate ring 1 and 24 points proximate central driving ring 2.

What is claimed is:

1. A magnetic tape reel for computers, said reel comprising:
   a central part comprising a driving hub having a first set of spokes extending radially outwardly from the outer surface of said hub on opposite sides of said central part;
   a support ring concentric with said hub and having a second set of spokes extending radially inwardly from said inner surface of said ring on opposite sides of said central part; and
   two side flanges formed with inner and outer welding surfaces projecting so as to contact said central part at said first and second sets of spokes, said side flanges being connected to said central part by means of ultrasonic welds along those surfaces where the side flanges contact said first and second sets of spokes forming a box-like structure having a high resistance to compression produced by tape being wound thereon.

2. The magnetic tape reel of claim 1 wherein each said flange is provided with a joggle for housing the corresponding annular edges of the support ring, so that a sharp edge appears between each said flange and said ring.

3. The magnetic tape reel of claim 1 wherein said central part further possesses repeating orifices proximate the driving hub which are intended to receive protrusions fixed on one of the side flanges.

4. The magnetic tape reel of claim 3 wherein one set of spokes extending from the inner surface of the driving ring terminate at a point before reaching said repeating orifices on the side of the central part intended to receive said protrusions fixed on one of the side flanges.

* * * * *